United States Patent [19]

Rodriguez et al.

[11] 4,191,885
[45] Mar. 4, 1980

[54] METHOD FOR DETERMINING WEIGHT OF MOLTEN METAL IN SITU

[75] Inventors: Federico A. Rodriguez, Garza Garcia; Jorge Becerra Novoa, San Pedro Garza Garcia; Julian Sanchez Ramirez, Monterrey, all of Mexico

[73] Assignee: Hylsa, S.A., Monterrey, Mexico

[21] Appl. No.: 968,764

[22] Filed: Dec. 12, 1978

[51] Int. Cl.² .............................................. G09K 3/00
[52] U.S. Cl. ........................................ 250/302; 177/1
[58] Field of Search .............. 250/302, 303, 277, 278, 250/279, 272; 177/1; 73/149, DIG. 9

[56] References Cited

U.S. PATENT DOCUMENTS

| | | | |
|---|---|---|---|
| 2,924,719 | 2/1960 | Kalinsky | 250/303 |
| 3,089,378 | 5/1963 | Berk | 86/32 |
| 3,256,947 | 6/1966 | Fiedler et al. | 177/1 |
| 3,439,759 | 4/1969 | Rouanet et al. | 177/1 |
| 3,624,828 | 11/1971 | Edwards | 73/149 |
| 3,745,338 | 7/1973 | Joyce | 250/303 |

OTHER PUBLICATIONS

"Control of Composition in Steelmaking", *The Iron and Steel Institute*, Townsend et al., May 1966, pp. 99–109.

*Primary Examiner*—Bruce C. Anderson
*Attorney, Agent, or Firm*—Curtis, Morris & Safford

[57] ABSTRACT

Method for rapid and accurate weight determination of molten metal in a slag-containing bath preferably without any necessity for direct gross weighings in a hostile steel works environment or otherwise, by the addition to the molten bath of a known weight amount of a "trace" element (preferably of a type which is completely diluted in the molten metal, to the practical exclusion of the slag); awaiting the even dispersal of the trace element in the molten metal (aiding the speed of dispersal by promoting a boiling action, if necessary); taking a sample of the molten metal; analyzing the sample to determine the weight percent of trace element in the molten metal (for example by spectrometric analysis); and determining the weight of the metal from the known values of weight of the trace element added and its weight percent in the molten metal after addition.

In the event that a measurable amount of the trace element exists in the molten metal prior to the addition of the weighed amount, then it is also necessary to take a sample of the metal prior to addition and determine the weight percent of the trace element in that first sample.

Alternatively, the trace element may selectively dissolve in the slag, thus similarly permitting the determination of the weight of the slag; but requiring a knowledge of the net weight of the molten bath if the weight of the molten metal is ultimately required.

Similarly, if the trace element used dissolves in both the molten metal and the slag; then it will be necessary in this case also to know the net weight of the molten bath (e.g. by crane weighing load cell systems) as well as the weight percentages in the slag (e.g. determined by x-ray fluorescence).

19 Claims, 3 Drawing Figures

METHOD FOR DETERMINING WEIGHT OF MOLTEN METAL IN SITU

This invention relates to a method of determining the weight of molten metal in a ladle and/or in a furnace containing the molten metal and slag, and more particularly to an improved method for such measurement which is especially useful in determining the weight of liquid steel in electric furnace operations prior to pouring of ingots so as to avoid butt ingots (i.e. short) at the end of such a teeming operation.

A continuing and longstanding problem in the steelmaking industry is the unavailability of a reliable and practical method of pouring from batch heats so as to avoid a short ingot at the end of the pour. Butt ingots are a substantial problem, because they cannot be used in the subsequent rolling or other metal forming operations and thus represent a significant economic loss since remelting is necessary and other handling is required. However, if a sufficiently accurate and reliable method is available for determining the weight of the steel in the furnace or ladle, then the molds can be teemed to within acceptance ranges and thus avoid a short ingot in the last mold.

In a typical rolling mill (for example assignee's) an acceptable range of permissible weights for an ingot might be 3350–5000 kg. (e.g. an ingot 41" long by 16" wide and having a height varying from about 50" to about 72"). Other mills may differ somewhat.

Numerous articles discussing and suggesting attempts to minimize the short ingot problem have been written. An article summarizing many of the problems and discussing attempted prior art solutions and their drawbacks is Publication 99 entitled "Control of Composition in Steelmaking," of the *The Iron and Steel Institute* 99–109 (from a collection of papers given at the Annual General Meeting of the Iron and Steel Institute at London, England on May 4/5, 1966, which presents a paper by N. A. Townsend and J. Molloy entitled "Problems Associated with Weighing in Steelmaking Shop."

As recognized in the foregoing Townsend et al. article, relatively effective apparatus and methods are available for determining directly the weight of the ladle plus molten material which it contains. However it is extremely difficult to obtain a meaningful determination in a practical manner either of the slag weight or, more desirably, of the molten metal in the ladle. In the past, attempts have been made to arrive at the weight of the molten metal by estimating the weight of the slag and from this deriving the weight of the molten metal. As indicated in page 105 of the Townsend et al. article, methods for determining slag weight in teeming ladles "using nuclear radiation techniques, hydrometers, and electro-chemical phenomena are rejected as being unnecessarily complicated for works use." Yet the four prior art methods which it proceeds to suggest are merely methods for attempting estimates rather than true determinations. For example, the first method is to take the gross weight of the ladle when the slag appears and again when tapping is finished and "from experience" half the difference of these readings represents the slag weight ("although intrinsically not very accurate"). The second is merely a statistical analysis of the weight of slag left after teeming for about 200 casts, again a very rough estimate. The third method requires a determination of the total volume of steel plus slag which is very difficult to obtain, typically being merely estimated (because even if possible to obtain one accurate determination, subsequent determinations would vary as a result of initial and repair bricking procedures and also after each melt due to brick wear). In this method, the weight of the steel is equal to $P_1(W-P_2V) \div (P_1-P_2)$; where $P_1$ is the density of steel, $P_2$ is the density of slag, W is the net weight of steel plus slag and V is the total volume of steel plus slag. The fourth method is essentially similar, except the slag depth is measured directly by means of a probe, the volume of the slag can then be estimated from a knowledge of the vessel size (corrected for wear), and the slag weight ultimately estimated from a knowledge of the slag density.

The use of radioactive trace elements to measure the weight of materials has long been known. However this has not proven adaptable to measuring the weight of liquid steel as practical matter in refining operations. Among the drawbacks are the danger in handling radioactive material, the limited availability and the cost of radioactive elements, particularly in view of the large amounts that would be required in order to give the required degree of accuracy.

In addition to avoiding short ingots during teeming, the determination of the accurate weight of molten metal can also be significant use in process control, for example in producing steel within given specifications, and the like.

It is accordingly an object of the present invention to provide an effective and practical method for determining the weight of molten metal in a slag-containing bath. It is another object of the invention to provide such a method which gives the weight of molten steel with greater accuracy than has been heretofore achieved by prior art practices. It is a further object to provide such a method which is relatively rapid and inexpensive and consistently accurate, all without necessitating extensive and repeated diversion of plant equipment from production use for calibration and similar requirements.

It is a still further object of a simplified alternative preferred embodiment of the present invention to provide such a method which gives necessary accuracy and yet requires only a minimum of sampling of the molten bath and laboratory measurements enabling the indirect determination of the weight of molten metal without any need at all for any bulk direct weighing in a hostile environment or otherwise.

Applicant, presented with this art-recognized continuing problem, has discovered a surprisingly simple method of indirect weight determination by (1) analyzing, if necessary, the weight percent composition of the molten metal and/or slag; (2) adding a known weighed amount of a given element to the molten bath; (3) after dilution (typically in about 10 minutes) analyzing the molten metal and/or slag; (4) determining, if necessary, the total bath weight (molten metal plus slag) preferably by a direct weighing; and (5) determining from these known quantities the weight of the molten metal. By appropriate choice of the given element and other charge materials, steps (1) and/or (4) can be entirely eliminated.

In this specification and in the accompanying drawings are given and show preferred embodiments of the present invention; but it is to be understood that these embodiments are not intended to be exhaustive nor limiting of the invention. On the contrary, these preferred embodiments are given for the purpose of illustration only in order that others skilled in the art may fully understand the invention and the purposes thereof and the manner of applying it for practical use so that they may modify and adapt it in various forms each as may be best suited for the conditions of a particular use.

Figure 1:
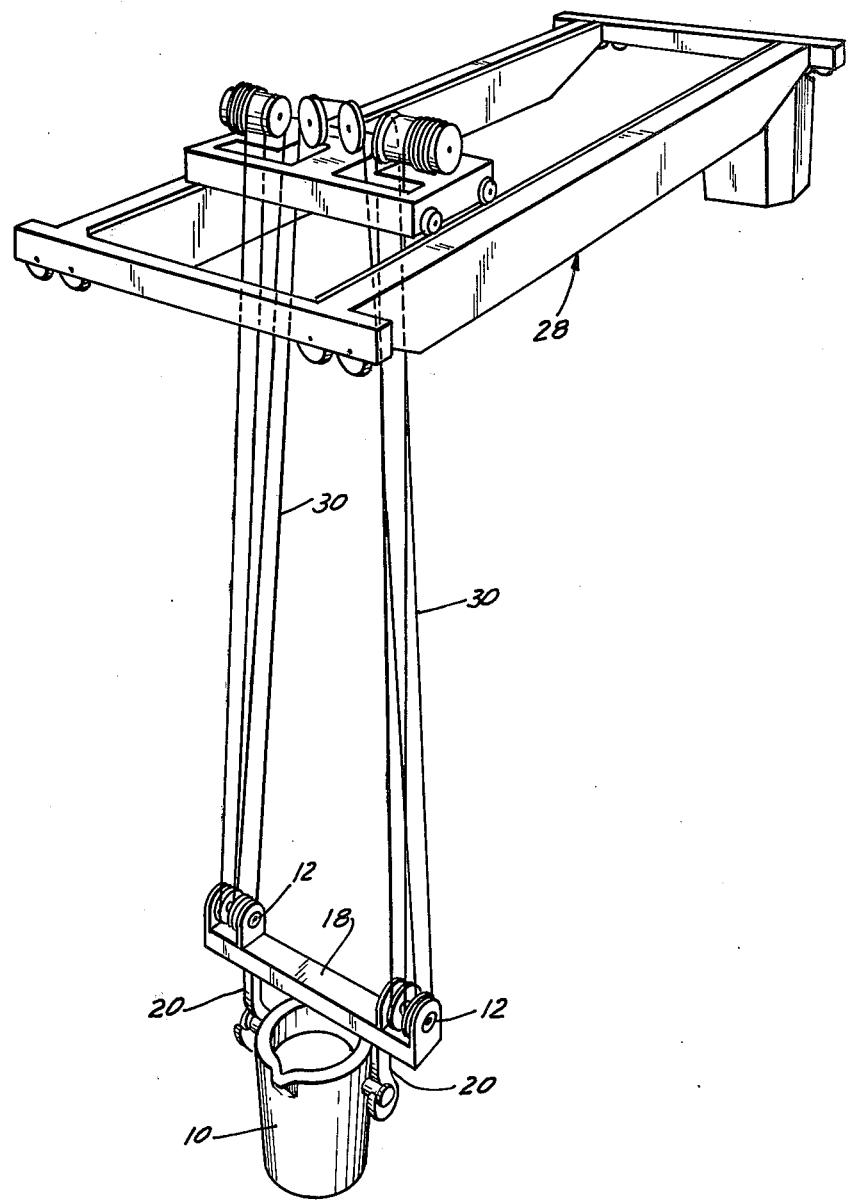
FIG. 1 is a diagrammatic perspective view of an overhead crane with a suspended ladle, illustrating one type of crane weighing system useful in the present invention.

As will be seen from the following discussion of the preferred embodiments of this invention, both the very simplicity of the invention and the unsatisfactory solutions provided by the prior art effectively demonstrate its novelty and unobviousness. It has long been recognized that one could with reasonable accuracy directly determine the total weight ($W_t$) of a bath [comprising the weight of the molten steel ($W_m$) plus the weight of the slag ($W_s$)] according to the relation:

$$W_t = W_s + W_m \qquad (1)$$

Since the $W_t$ can be determined directly by apparatus of the type illustrated in the accompanying figures, by balance beam devices (e.g. U.S. Pat. No. 3,256,948), and the like; this leaves as two unknowns the weight of the slag and the weight of the steel.

Applicant has uniquely recognized for the first time in this art that by adding a known amount of a "trace" element of the molten bath (preferably an alloying component already required for the ultimate metallic product) one can indirectly, but accurately, determine the weight of the molten metal ($W_m$) in the bath, according to the following relation:

$$100 W_e = W_s(\%E_{s2} - \%E_{s1}) + W_m(\%E_{m2} - \%E_{m1}) \qquad (2)$$

where $W_e$ = weighed amount of trace element added, $\%E_{s1}$ = wt. % of trace element in slag before adding $W_e$;

$\%E_{m1}$ = wt. % of trace element in molten metal before adding $W_e$;

$\%E_{s2}$ = wt. % of trace element in slag after adding $W_e$;

$\%E_{m2}$ = wt. % of trace element in molten metal after adding $W_e$.

It will be appreciated that the words, "trace" element, as used herein are not necessarily intended to be as restrictive in amount as in the usual meaning (since the trace element according to the present invention could for certain alloys constitute as much as 20% of the molten metal).

Very surprisingly, in a preferred embodiment according to a narrower aspect of this invention, it is possible to obtain the weight of the molten metal ($W_m$) merely by determining the weight of the trace element to be addded, and by a single analysis of the molten metal to determine the weight percent of the element in the molten metal portion of the bath after addition ($\%E_{m2}$). In this special circumstance the weight of the molten metal is determined by the following relation:

$$W_m = W_e \times 100 / \%E_{m2} \qquad (3)$$

In this special case, it has been assumed that the molten metal contains no significantly measurable amount of the trace element before the addition of a known amount of the latter. This would typically be the situation in a charge to an electric furnace of sponge iron made from ore not containing the trace element. By "no significantly measurable amount of trace element" is meant that any trace element originally present is in such small amounts as not to affect adversely the required accuracy of the $W_m$ determination for the intended purpose. Thus, "a significantly measurable amount" would be an amount of said trace element in said molten bath which does adversely affect the desired accuracy of $W_m$.

In this special case, it is also assumed that the trace element used would dissolve for all practical purposes only in the molten metal and would not be present in a significantly measurable amount in the slag (an example of this would be copper in a steel refining process). With these foregoing assumptions, it would be appreciated that $\%E_{s2}$, $\%E_{s1}$, and $\%E_{m1}$ in equation 2 will all be zero and thus equation 3 is readily derived therefrom. Significantly with these limitations, the need to determine the weight of the molten bath ($W_t$) is eliminated altogether and thus the equipment illustrated in the accompanying drawings is unnecessary.

The following example, based on experimental data, will illustrate one application of this narrower embodiment of the present invention.

EXAMPLE 1

If 90 kg. of copper is added to a molten bath of steel in an electric furnace having a good boiling action, good uniform distribution of the copper in the bath is achieved in about 10 minutes. A sample is then taken and analyzed in the laboratory with a spectrometer that gives a percent reading of 0.097 of copper (typically giving an accuracy of 0.001% within about 2 minutes). No analysis of the slag need be made, since it is known that no appreciable amount of copper will be dissolved in the slag. Thus from equation 3 above, and assuming the weight of the total molten bath is 95,000 kg., then it has been determined that the weight of the molten metal ($W_m$) will be 92,783.5 kg. ($\pm 928$ kg.).

While copper is typically considered undesirable in the steel; applicant has discovered that in practicing this invention, the concentration level can be kept so low that its effect is negligible.

With the spark and arc spectrometer, and also the atomic absorption spectrometer, an overall weight measurement accuracy of the molten bath of about 1% can be expected.

In the foregoing example, if the charge to the electric furnace had included scrap or ore which had a sufficient amount of copper as an impurity, then to get a reliable result it would be necessary to take a sample of the molten metal prior to the addition of the known amount of copper ($W_e$), and from that sample determine the weight percent of the copper ($\%E_{m1}$) in the steel prior to the addition of such weighed amount of copper. In this latter case, the weight of the molten metal would be determined from the following relation:

$$100 W_e = W_m \%E_{m2} - (W_m - W_e)\%E_{m1} \qquad (4)$$

It will be understood that ($W_m - W_e$) is the weight of the molten metal prior to the addition of the trace element. If the amount of trace element added to the molten bath is sufficiently small, then the weight of the molten metal bath before and after the addition of the trace element can be, for all practical purposes, assumed to be identical; in which case equation 4 simplifies to:

$$W_m = 100 W_e \div (\%E_{m2} - \%E_{m1}) \qquad (5)$$

Nickel in appropriate Ni-containing steel alloys can be a more desirable additive (in place of copper), since it also dissolves essentially only in the liquid steel and not in the slag. However, the specifications for the steel with which applicant typically works have an upper limit of about 0.15% of nickel and with many spectrometers available it is not possible to obtain the required level of precision to determine the weight of steel to the required accuracy. With better instrumentation or with alloys requiring more nickel, this would not be a problem.

Some of the considerations in determining the desirability of a particular element as a trace element useful in the present invention include that the trace element be readily dilutable in the molten bath and not escape as a gas at the bath temperatures, not be detrimental to the final product (at least in the concentration levels required to give the necessary results), be detectable by reasonably accurate and practical methods of analysis within a reasonably short time period, and preferably also as a practical matter be sufficiently available and inexpensive. In the broader aspects of this invention, one of ordinary skill in the art can readily determine the suitability of an appropriate element for use in this invention, given the teaching of this specification. Obviously a trace element which might be useful in determining the weight of molten steel might not be useful in determining the weight of some other metal in a molten bath containing slag. However, appropriate trace elements can be determined without undue experimentation.

Examples of additional potentially useful trace elements which are essentially selectively dissolved in liquid steel and not in the slag include cobalt, tin, molybdenum and tungsten. A variation in the composition of the slag may affect whether a given element will dissolve therein or not.

Another series of trace elements useful according to the present invention are those which typically stay only in the slag. An advantage of such trace elements is that the analysis techniques do not require such high precision because the amount of slag is usually small. As a result, the concentration level of a given amount of the trace element in the slag can be relatively high. With these latter trace elements, the weight percent thereof in the molten metal will be effectively zero. Thus another advantage of these latter elements is in not adversely affecting alloy specifications. With $\%E_{m1} = 0$ and $\%E_{m2} = 0$ and by reference to equation 2 above, it can also be readily seen that the weight of the slag can be rapidly determined. However, since it is the weight of the molten metal which is usually desired, it will therefore be necessary to determine directly the overall weight of the slag plus metal according to equation 1 above. As previously indicated this can be directly determined by the use of crane weighing systems utilizing load cells (of the type illustrated in the drawings and discussed more fully below).

Assuming that there is no trace element in the original molten bath, the applicable equation simplifies to:

$$W_m = W_t - (100 W_e \div \%E_{s2}) \qquad (6)$$

Useful trace elements which stay in the slag would include the rare earths, zirconium, calcium and magnesium. The relatively low availability of the rare earths and their consequent costs might make them somewhat less useful than other possible elements.

An example illustrating the use of this latter group of trace elements is as follows:

EXAMPLE 2

If 50 kg of Zr are added to a molten bath of 95,000 (which originally contains no measurable Zr) and the slag is then found to have a Zr wt.% of 1.67%, then from equation 6 above the weight of the molten metal ($W_m$) will be 92,005.99 kg.

Applicant has also discovered that a trace element which can be dissolved in both the liquid steel and the slag can be usefully employed according to the broader aspects of the present invention, but as in Example 2 would also require the additional weighing step. Examples of this latter type of trace element would include Ta, Nb, Mn, Cr, V, and Se. Of these the element which would be particularly useful is manganese; because in most types of steel, this is a substantial component of the desired alloy and therefore typically relatively large amounts can be added without adversely affecting the final product (thus enabling a much higher degree of precision because of the high level of concentration in the steel). For example, some works require that the steel have a lower limit of about 0.25% of Mn. Percentages of Mn of up to 12% and even 14% are not uncommon in other types of steel. The presence of Mn in slag can be readily determined in about two (2) minutes by currently known X-ray fluourescence techniques (see for example the article in *Steel Times* for May, 1970 at pages 344 to 348, by A. Reid and B. J. Ronnie entitled "X-Ray Fluorescence Analysis of Slags at Clydesdale Steel and Tube Works").

The measurements of Mn in the sample taken from the molten steel as previously indicated can be done by the spark and arc spectrometer, etc.

An illustration of this preferred embodiment utilizing Mn and based on experimental data is shown in the following example:

EXAMPLE 3

For simplicity of calculation and presentation, in this example there is again no trace element (Mn) present in the molten bath prior to addition of the weighed amount of Mn. After 360 kg of Mn has been added, subsequent analysis gives a weight percent in the slag of 2% and in the molten steel of 0.32%. The total weight of the molten bath is given as 95,000 kg. Note that the weight percents of Mn in the bath prior to the addition of the weighed amount of Mn are equal to 0. Thus, the values can be summarized as:

$W_e = 360$ kg.
$\%E_{s2} = 2\%$
$\%E_{m2} = 0.32\%$
$W_t = 95,000$ kg.
$\%E_{s1} = 0$
$\%E_{m1} = 0$

Substituting these values in equation 12 below; then the weight of the molten steel is calculated to be 91,666.6 kg.

If the amount of "trace" element added is sufficiently large, then equation 2 (to be generally applicable) should be modified as follows:

$$100W_e = (W_s\%E_{s2} - (W_s - XW_e)\%E_{s1}) + (W_m\%E_{m2} - (W_m - YW_e)\%E_{m1}) \quad (7)$$

where:

$X$ = Fraction of added trace element that dissolves in the slag.

$Y$ = Fraction of added trace element that dissolves in the molten metal.

$W_m$ = Weight of molten metal after addition of trace element.

$W_s$ = Weight of slag after addition of trace element.

$W_s - XW_e$ = Weight of slag before addition of trace element.

$W_m - YW_e$ = Weight of molten metal before addition of trace element.

$XW_e$ = Weight of added trace element that dissolves in the slag.

$YW_e$ = Weight of added trace element that dissolves in the molten metal.

In order to solve for $W_m$, we make use of the following equations, these can be obtained by means of material balances.

$$W_t = W_s + W_m \quad (1)$$

$$W_s(\%E_{s2}) - (W_s - XW_e)(\%E_{s1}) = 100XW_e \quad (8)$$

$$W_m(\%E_{m2}) - (W_m - YW_e)(\%E_{m1}) = 100YW_e \quad (9)$$

$$X + Y = 1 \quad (10)$$

By (1) solving equation 8 for X, (2) solving equation 10 for Y, (3) substituting the solution for Y from equation 10 into equation 9, and substituting the solution for X from equation 8 into equation 9, we can then solve for $W_m$ as follows:

$$W_m = \frac{(100 - \%E_{s1})(100 W_e - W_e \%E_{m1}) - (\%E_{s2} - \%E_{s1})(100 W_t - W_t \%E_{m1})}{(100 - \%E_{s1})(\%E_{m2} - \%E_{m1}) - (\%E_{s2} - \%E_{s1})(100 - \%E_{m1})} \quad 11$$

If there is no trace element present before the weighed amount ($W_e$) is added, then the general formula simplifies to:

$$W_m = (W_t \%E_{s2} - 100 W_e)/(\%E_{s2} - \%E_{m2}) \quad (12)$$

The sampling of the molten metal and/or of the slag can be accomplished by the common technique of dipping a handheld probe having a small ladle at the end into the appropriate portion of the bath.

Rapid dilution of a newly added weighed charge of trace element can be obtained in an electric furnace which is charged with sponge iron having, for example, 2% carbon (as a combined carbon in the form of iron carbide), because the latter gives a rapid boiling action assuring good distribution within about ten minutes in a 100 metric ton furnace.

Figure 3:
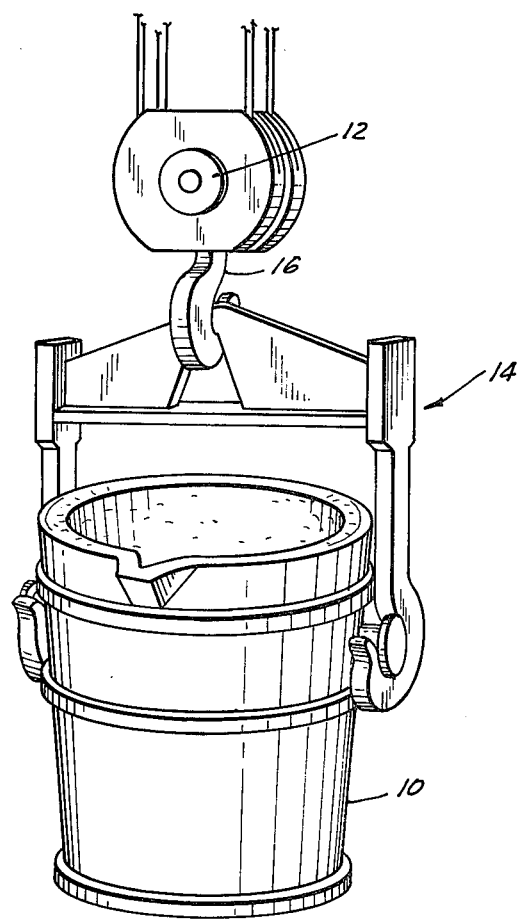
FIG. 3 is an alternative embodiment of a portion of the device of FIG. 1.

A system for determining by direct measurement the weight of the molten bath is shown in the drawings. For purposes of simplicity, the container for the molten bath is shown as a ladle 10. As shown in FIG. 3, load cells 12 sense the weight of the ladle 10 plus the support frame 14 and hood 16 by measuring the mechanical deformation of the load cells 12 by that combined weight. When the ladle 10 is empty the tare of that combined weight can be determined and the readout of the load cells 12 set for zero. This can be quickly established for each weighing, without the necessity of taking the ladle nor the crane out of use in the production process.

Figure 2:
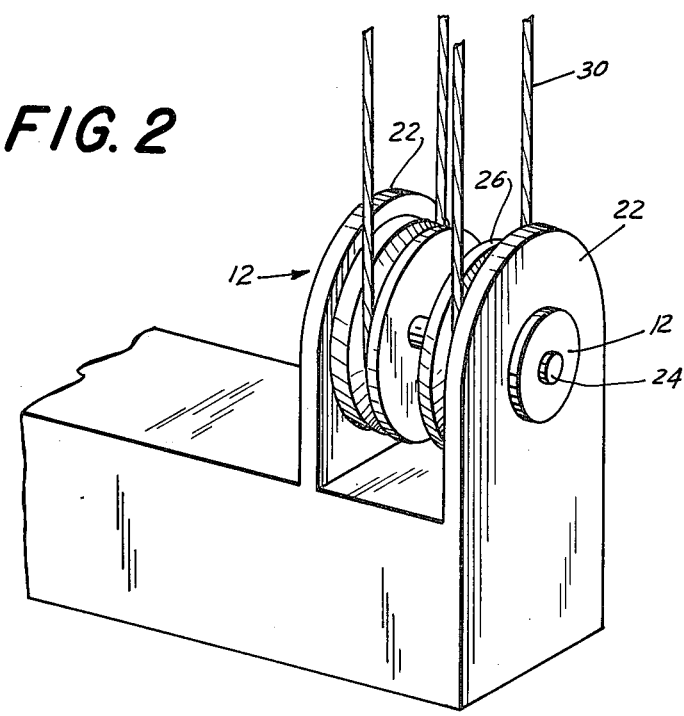
FIG. 2 is a detail of FIG. 1 illustrating a preferred location for the weight-sensing load cells.

FIG. 1 shows the use of load cells in conjunction with a spreader beam 18 hung from an overhead crane which handles the ladle 10. The ladle 10 is suspended from a spreader beam 18 by hooks 20. As shown more clearly in FIG. 2, the load cells 12 are mounted on the spreader beam 18 in bearing plates 22. The load cells support the axles 24 of the sheaves 26. The spreader beam is suspended from the crab 28 of the overhead crane by a cable 30.

The load cells could alternatively be placed between the hooks 20 and spreader beam 18, or even at various points on the crab. The latter is perhaps somewhat more desirable in being removed from the hostile environment, but introduces the possibility of erroneous readings because of cable and bearing friction.

Load cells of either the strain gauge or magneto-strictive types can be utilized, so long as the required accuracy is obtained.

The foregoing weight and weight percentage determination(s) and data processing can be automated to generate a signal useful to similarly automatically control timing operation to avoid the formation of butt ingots from any given bath pour.

We claim:

1. Method for determining the weight of molten metal in a slag-containing molten bath such as occur in an electric furnace or in a teeming ladle comprising determining weight percentage(s) of a given trace element in the molten metal and/or slag if present in a significantly measurable amount, adding to and diluting in said bath a weighed amount of said trace element, effecting good dispersal of said trace element in said bath and then determining the weight percentage(s) of said trace element in said molten metal and/or slag if present in a significantly measurable amount therein, determining the net weight of said bath if a significantly measurable amount of said trace element is in said slag, and determining from the foregoing known weights and weight percentage(s) the weight of said molten metal.

2. Method according to claim 1, wherein said weight percentage(s) of said trace element is determined by analytical analysis of sample(s) from said bath.

3. Method according to claim 2, wherein the analysis of sample(s) from the molten metal is by means of a spectrometer and the analysis of any samples from the slag is by x-ray fluorescence, and the metal is an iron-based alloy.

4. Method according to claim 3, wherein the trace element is selected from the group consisting of Cu, Ni, Co, Sn, Mo, W, rare earths, Zr, Ca, Mg, Ta, Nb, Mn, Cr, V, and Se.

5. Method according to claim 2, wherein the trace element is Mn.

6. Method for determining the weight of molten metal in a slag-containing bath such as occur in an electric furnace or in a teeming ladle comprising weighing and adding to said bath a known amount of a trace element of a type which will be diluted and evenly dispersed in said molten metal essentially to the exclusion of said slag, analyzing a sample of said molten metal after dispersal is complete to determine the weight percentage therein of said trace element, similarly having previously determined the weight percentage of said trace element in said molten metal prior to addition of said known amount thereof but omitting this latter step if it is known that no significantly measurable amount of said trace element is present in the original bath, and determining the weight of said metal from said known weight and weight percentages of said trace element.

7. Method according to claim 6, wherein said trace element is Cu and said molten metal is an iron-based alloy.

8. Method according to claim 6, wherein said trace element is Ni and said molten metal is an iron-based alloy.

9. Method according to claim 6, wherein the weight of the metal ($W_m$) is determined relative to the equation:

$$W_m = W_e(100 - \%E_{m1}) \div (\%E_{m2} - \%E_{m1})$$

where $W_e$ is the weight of the added trace element, $\%E_{m1}$ is the wt. % of the trace element in the molten metal prior to addition, and $\%E_{m2}$ is the wt. % of the trace element in the molten metal after the addition.

10. Method according to claim 1, wherein the weight of the metal ($W_m$) is determined relative to the equation:

$$W_m = \frac{(100 - \%E_{s1})(100\, W_e - W_e \%E_{m1}) - (\%E_{s2} - \%E_{s1})(100\, W_t - W_t \%E_{m1})}{(100 - \%E_{s1})(\%E_{m2} - \%E_{m1}) - (\%E_{s2} - \%E_{s1})(100 - \%E_{m1})}$$

where $W_e$ is the weight of the added trace element, $\%E_{m1}$ is the wt. % of the trace element in the molten metal prior to addition, $\%E_{m2}$ is the wt. % of the trace element in the molten metal after the addition, $\%E_{s1}$ is the wt. % of the trace element in the slag prior to addition, $\%E_{s2}$ is the wt. % of the trace element in the slag after the addition, and $W_t$ is the net weight of the bath.

11. Method according to claim 1, wherein the said trace element is readily dispersible in and retained by said molten bath and is added thereto in an amount to give a concentration range in the molten metal having an upper limit which is less than an amount which would adversely affect the final product to be derived from the molten metal and a lower limit which is sufficiently large to give at least a weight accuracy of the molten metal of ±1 wt. %.

12. Method for controlling the size of metal ingots to avoid butt ingots when pouring molten metal from a slag-containing molten bath such as occur in an electric furnace or in a teeming ladle comprising determining weight percentage(s) of a given trace element in the molten metal and/or slag if present in a significantly measurable amount, adding to and diluting in said bath a weighed amount of said trace element, effecting good dispersal of said trace element in said bath and then determining the weight percentage(s) of said trace element in said molten metal and/or slag if present in a significantly measurable amount therein, determining the net weight of said bath if a significantly measurable amount of said trace element is in said slag, generating a signal based on said determinations which is indicative of the weight of said molten metal, utilizing said signal to control the pouring of the molten metal of said bath to form ingots of substantially equal size which can vary in size from one another within predetermined limits.

13. Method for determining data useful for determining weight of molten metal in a slag-containing molten bath such as occur in an electric furnace or in a teeming ladle comprising determining weight percentage(s) of a given trace element in the molten metal and/or slag if present in a significantly measurable amount, adding to and diluting in said bath a weighed amount of said trace element, effecting good dispersal of said trace element in said bath and then determining the weight percentage(s) of said trace element in said molten metal and/or slag if present in a significantly measurable amount therein, determining the net weight of said bath if a significantly measurable amount of said trace element is in said slag.

14. Method for determining the weight of molten metal from the data determined by the method of claim 13, comprising correlating the weight and weight percentage determination(s) with the weight of the molten metal.

15. Apparatus for measuring the weight of molten metal in a slag-containing bath, comprising means for determining the weight of a trace element capable of being fused and evenly diffused wholly into said molten metal and/or said slag of said bath, means for determining the weight percentage(s) of said trace element in whichever of said molten metal and said slag that said trace element is soluble, means for determining the net weight of the bath if said trace element is soluble in measurably significant amounts in said slag, means adapted for processing the determinations from the foregoing means to generate a signal indicative of the weight of said molten metal.

16. Method according to claim 11, wherein said moltena metal is a steel alloy, said trace element is nickel, and said concentration range is between 0.15 wt. % and 20 wt. %.

17. Method according to claim 11, wherein said molten metal is a steel alloy, said trace element is manganese, and said concentration range is between 0.35 wt. % and 20 wt. %.

18. Method according to claim 11, wherein said concentration range is between 0.1 wt. % and 20 wt. %.

19. Method for determining the weight of molten slag is a molten metal bath such as occur in an electric furnace or in a teeming ladle comprising determining weight percentage(s) of said trace element in said molten metal and/or slag if present in a significantly measurable amount therein, determining the net weight of said bath if a significantly measurable amount of said trace element is in said molten metal, and determining from the foregoing known weights and weight percentage(s) the weight of said molten slag.

* * * * *